United States Patent [19]

Cole et al.

[11] Patent Number: 4,951,285
[45] Date of Patent: Aug. 21, 1990

[54] LASER WITH ADJUSTABLE MIRROR FOR MODE CONTROL

[75] Inventors: John L. Cole, Sunnyvale; David Wright, Redwood City; Alan B. Petersen, Palo Alto; Shinan-Chur S. Sheng, Sunnyvale; Troy M. Artusy, Saratoga, all of Calif.

[73] Assignee: Spectra-Physics, San Jose, Calif.

[21] Appl. No.: 214,747

[22] Filed: Jul. 5, 1988

[51] Int. Cl.⁵ .............................................. H01S 3/098
[52] U.S. Cl. ........................................ 372/19; 372/20; 372/99; 372/103; 372/107
[58] Field of Search ...................... 372/19, 20, 99, 103, 372/107

[56] References Cited

U.S. PATENT DOCUMENTS

| | | | |
|---|---|---|---|
| 3,573,656 | 4/1971 | Marcatili | 372/107 |
| 3,731,991 | 5/1973 | Arnold | 372/23 |
| 3,839,684 | 10/1974 | Matsuko et al. | 372/107 |

OTHER PUBLICATIONS

Raymond J. Roark, *Formulas for Stress and Strain*, Fourth Edition, McGraw-Hill, Inc., 1965.

Primary Examiner—William L. Sikes
Assistant Examiner—Georgia Y. Epps
Attorney, Agent, or Firm—Fliesler, Dubb Meyer & Lovejoy

[57] ABSTRACT

A laser comprising a first mirror having a shape. The shape is generally spherical for typical lasers with the shape of the mirror being defined by the radius of curvature of a reflective surface on the mirror. A second mirror is provided mounted with the first to define a laser cavity. The cross-sectional sizes of the modes of oscillation within the laser cavity are defined by the shape of the first mirror. An aperture at a given location having a fixed cross-sectional size is mounted with the laser cavity. Alternatively, a laser bore which forms an effective aperture at a given location is used. A means is mounted with the first mirror for adjusting the shape of the first mirror so that the cross-sectional size of a selected mode at the given location matches the cross-sectional size of the aperture.

16 Claims, 3 Drawing Sheets

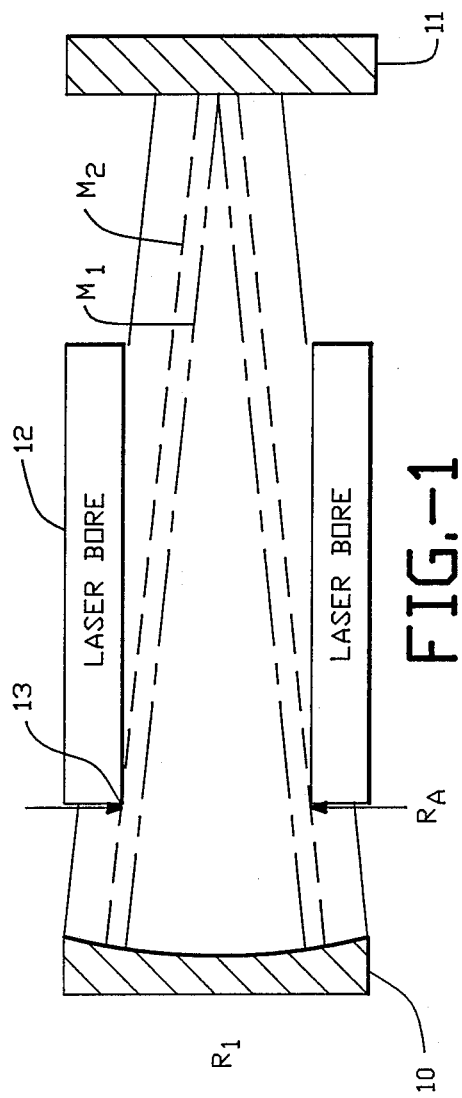
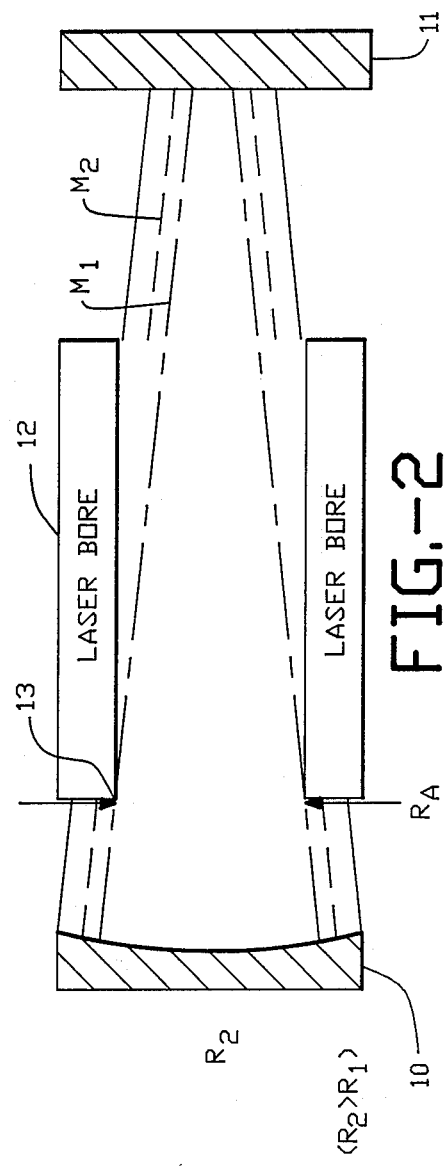

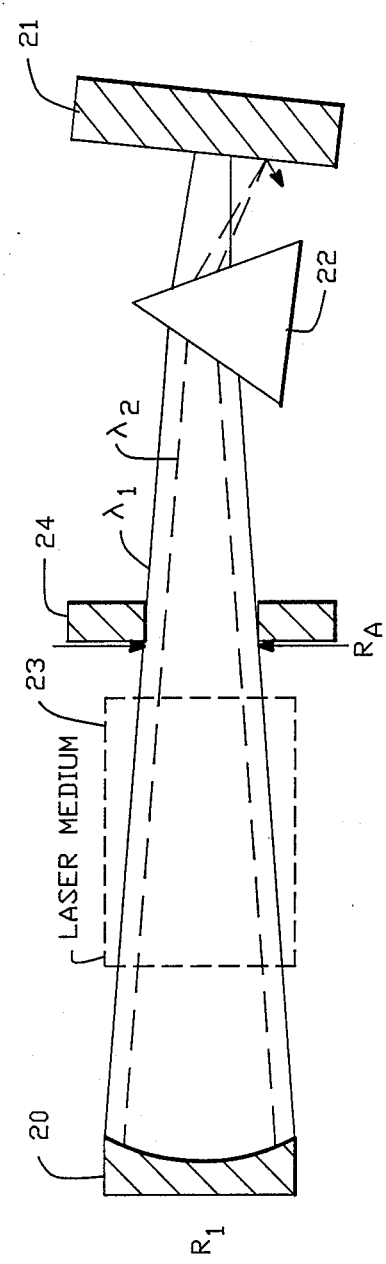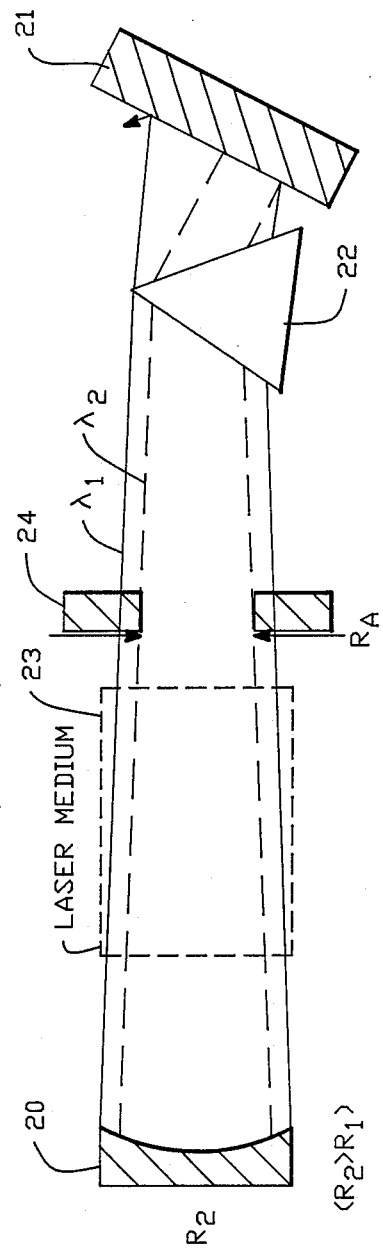

LASER WITH ADJUSTABLE MIRROR FOR MODE CONTROL

BACKGROUND OF THE INVENTION

1. Field of the Invention

The present invention relates to apparatus for control of modes of oscillation in lasers.

2. Description of Related Art

Lasers are characterized by a resonant laser cavity defined by reflective surfaces. For the typical laser, two mirrors are used. In commercial lasers, a common cavity called near-hemispheric, includes a spherical mirror at one end and an optically flat mirror at the other. The radius of curvature of the spherical mirror is set so that the center of curvature of the spherical mirror lies beyond the flat mirror. This near-hemispheric arrangement avoids many of the problems of alignment suffered by other types of laser cavities. Further, this type of cavity serves as an excellent example for demonstrating the operation of the present invention.

A given laser, including laser medium and a resonant cavity, will generally support a plurality of modes of oscillation. These modes of oscillation will include different wavelengths, for instance, 4579 Angstroms and 5145 Angstroms, (among others) for the argon ion laser. Further, different transverse modes of oscillation clustering around the primary wavelengths, will occur within the same cavity. For many applications, only one transverse mode designated the $TEM_{00}$, or the lowest order mode, is desired. The lowest order mode typically has a smaller and more uniform beam cross-section than higher order modes. The size of modes within the laser cavity, called mode size, is one characteristic of modes that is used to discriminate between desired and undesired modes. The cross-section of lower order modes within the laser cavity is smaller than the cross-section of higher order modes. Also, the cross-sections of the modes of longer wavelengths are greater than the cross-sections of corresponding modes in shorter wavelengths.

In the near-hemispheric example discussed above, the lowest order modes are essentially cone-shaped with the smaller end of the cone on the flat mirror. The cross-sectional size of a given mode at any point within the laser cavity is determined by the radius of curvature of the spherical mirror.

Suppression of transverse modes in the prior art has been accomplished using apertures within the laser cavity which block oscillation of modes having a larger cross-sectional size than the aperture at the location within the cavity at which the aperture is placed. Alternatively, the bore size of a gas laser can be selected so that it forms an effective aperture suppressing unwanted modes of oscillation.

Problems arise in lasers employing apertures if the user desires to change the frequency of light generated by the laser. The oscillation can be started by adjusting prisms or other filtering components in the laser to filter out unwanted wavelengths and allow oscillation of the selected wavelength. However, the mode size changes when the wavelength is changed. Therefore, the aperture or bore size will no longer be optimal and may allow oscillation of unwanted transverse modes. Alternatively, the aperture or bore size may be too small and suppress the desired wavelength. Prior art systems have addressed the problem by providing adjustable apertures with lasers. However, adjustable apertures are complicated and expensive, and are particularly difficult to install in sealed gas lasers.

In lasers which rely on the bore size of the laser to suppress unwanted modes of oscillation, an additional problem arises due to erosion of the bore. Inevitably, laser bores will erode due to natural sputtering action over the life of the laser. As the bore erodes, the effective aperture size increases. As the aperture size increases, transverse modes of oscillation will begin to occur. These transverse modes will compete with the available population inversion in the laser medium and decrease the usable $TEM_{00}$ output power of the laser. Further, the quality of the beam output will be reduced.

SUMMARY OF THE INVENTION

The present invention provides the ability to adjust dynamically the mode size within a given laser cavity of modes of oscillation. By dynamically adjusting the mode size of a desired mode of oscillation, a fixed aperture or bore within the laser cavity can be used to suppress unwanted transverse modes of operation even as the bore is eroded or the wavelength of the desired mode is changed. Accordingly, as the bore is eroded in a gas laser, the mode size of the desired mode can be increased to match the increase in the bore size. Also, as a given laser is switched to a different wavelength of oscillation, the mode size of the desired wavelength can be matched with the effective aperture size of the laser cavity to provide optimum transverse mode suppression.

Accordingly, in one aspect, the present invention is a laser comprising a first mirror having a shape. The shape is generally spherical for typical lasers with the shape of the mirror being defined by the radius of curvature of a reflective surface on the mirror. A second mirror is provided mounted with the first to define a laser cavity. The cross-sectional sizes of the modes of oscillation within the laser cavity are defined by the shapes of the two mirrors, although the mode is changeable upon the shape changes of either or both mirrors. An aperture at a given location having a fixed cross-sectional size is mounted within the laser cavity. Alternatively, a laser bore which forms an effective aperture at a given location is used. A means is mounted with the first mirror in this example for adjusting the shape of the first mirror so that the cross-sectional size of a selected mode at the given location matches the cross-sectional size of the aperture.

According to another aspect of the present invention, the first mirror comprises a reflective surface on a flexible disc made, for instance, of fused quartz. The reflective surface on the fused quartz disc will have an initial radius of curvature. A plunger is mounted for applying an adjustable force at a location near the center of the disc opposite the curved surface. As the amount of force applied to the disc is adjusted, the radius of curvature of the curved surface on the disc varies.

By adjusting the amount of force applied to the mirror, the shape of the mirror is adjusted and the mode size of the desired mode within the laser cavity is modified. By modifying the mode size, the laser output can be optimized by suppressing unwanted transverse modes and by ensuring that a maximum volume of the active region of the laser medium is utilized by the desired mode.

BRIEF DESCRIPTION OF THE DRAWINGS

FIG. 1 is a schematic diagram of a laser cavity illustrating the relationship of modes size to the effective aperture size of a laser bore.

FIG. 2 is a schematic diagram of a laser cavity illustrating the effect on mode size of changing the radius of curvature of a spherical mirror.

FIG. 3 is a schematic diagram of a laser cavity illustrating selection of wavelengths of light for laser oscillation and the effect on mode size of the wavelength of the mode of oscillation.

FIG. 4 is a schematic diagram of a laser cavity illustrating mode selection between various wavelengths and the effect of increasing the radius of curvature of the mirror to optimize mode size of a desired wavelength.

DESCRIPTION OF THE PREFERRED EMBODIMENT

Figure 5:
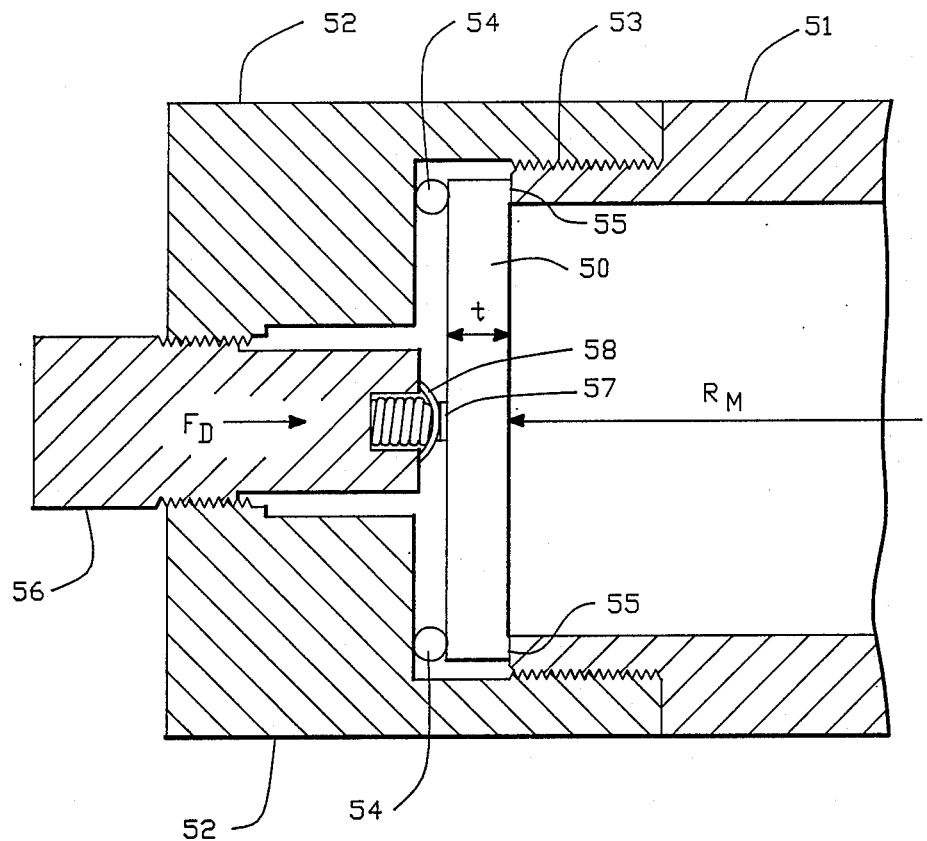
FIG. 5 is a drawing of a preferred embodiment of the apparatus for adjusting the shape of curvature of a mirror.

A detailed description of the preferred embodiment is provided with reference to the figures. First, with reference to FIGS. 1–4, effects of adjustment of mode size according to the present invention, are described. With reference to FIG. 5, a detailed description of the preferred embodiment of apparatus for adjusting the radius of curvature of a spherical mirror is described.

FIG. 1 is a schematic diagram of a laser including a first mirror 10 and a second mirror 11. The first mirror is spherical, having a radius of curvature R1. The second mirror 11 is essentially optically flat, having a high radius of curvature with respect to the length of the laser cavity. A laser bore 12 encloses a laser medium such as argon ion gas. The bore has an effective aperture size $R_A$ at location 13 in the laser cavity. The effective aperture size of the bore is typically defined by a plurality of discs or by a continuous bore within a sealed tube, that is used for conducting heat out of the active region of the laser medium. The plurality of discs or bore is usually formed of beryllium oxide, graphite, tungsten or other materials which suffer erosion due to sputtering effects within the tube. Accordingly, the effective aperture size $R_A$ of a typical gas laser will increase with age of the laser.

The effect of this increase in aperture size $R_A$ is illustrated in FIG. 1 schematically by the presence of two modes of oscillation, M1 and M2. The mode M1 is a desired mode. For the lowest order mode in a near-hemispheric laser cavity, the mode M1 will be basically cone-shaped with the narrow end of the cone near the flat mirror 11. The laser bore 12 will be placed as close to the spherical mirror 10 as possible in order to maximize the volume of the mode M1 inside the active region of the laser medium.

The mode M2 is a higher order, unwanted mode of oscillation. It likewise will be basically cone-shaped in the near-hemispheric laser cavity. However, the cross-section of the mode M2 at the position 13 in the laser cavity will be larger than the cross-section of the mode M1 at the same location.

As illustrated in FIG. 1, as the effective aperture $R_A$ of a laser bore increases to the point that mode M2 is unobstructed by the laser bore 12, oscillation in the unwanted mode M2 will begin. This has the effect of decreasing the power output in the lower mode M1 and making the spot shape of the output beam less uniform.

FIG. 2 illustrates the effect of increasing the radius of curvature of the mirror 10 to a value R2. By increasing the radius curvature of the mirror 10 to a value R2, the cross-section of the mode M2 at the location 13 will exceed the effective aperture size $R_A$ of the laser bore 12. This will suppress oscillation in mode M2. Further, the mode size of the desired mode M1 will increase in order to optimize the volume of the mode M1 in the active region of the laser bore 12.

FIGS. 3 and 4 schematically illustrate the present invention for wavelength selection. FIG. 3 illustrates a laser cavity including a first mirror 20 with a spherical reflective surface having a radius of curvature R1. A second mirror 21 is mounted opposite the first mirror 20 in order to define the resonant cavity of the laser. A prism 22 is mounted with the second mirror 21 in order to perform wavelength selection among modes of oscillation that can be supported by the laser medium 23. For instance, an argon ion gas laser medium can support oscillation in a plurality of output wavelengths λ1 and λ2. The longer wavelength λ1 will have a larger mode size than the shorter wavelength λ2. Likewise, the prism 22 will deflect the wavelength λ2 at an angle different from the deflection of wavelength λ1. The mirror 21 is aligned with prism 22 to support oscillation of wavelength λ1 in FIG. 3. Schematically illustrated in FIG. 3 is an aperture 24 having an effective aperture size of $R_A$ at a given location in the laser cavity. As illustrated, the mode size of the desired wavelength λ1 matches the effective aperture $R_A$ of the aperture 24 with a spherical mirror 20 having a radius R1. However, the mode size of the wavelength λ2, at the location of the aperture 24 is much smaller than the effective radius of the aperture $R_A$.

As the prism 22 and flat mirror 21 are rotated to support oscillation in the higher wavelength λ2 as shown in FIG. 4, the radius of curvature of the mirror 20 is increased to the value R2. By increasing the radius of curvature of the mirror 20, the cross-section of the mode for wavelength λ2, matches the effective aperture size $R_A$ of the aperture 24. At the same time, the mode size of the mode at wavelength λ1 is increased and is suppressed by the aperture 24. In addition, the shape of the mirror R2 can be tuned to match the desired mode wavelength λ2 with precision so that transverse modes associated with the primary mode of wavelength λ2 can be suppressed by fine adjustments of the shape of mirror 20.

FIG. 5 illustrates a preferred embodiment of means for adjusting the radius of curvature $R_M$ of a mirror 50. The means illustrated in FIG. 5 are particularly suited for use with a sealed gas laser and can be adapted for use with all lasers.

The means illustrated in FIG. 5 is mounted on the support structure 51 of the sealed gas laser. The mirror 50 is formed of a flat disc of fused quartz or other flexible material. It is ground to have a radius of curvature (concave with respect to the inside of the laser cavity) on the order of five to eight meters. The thickness of the disc forming the mirror 50 should be on the order of 1/10th of an inch. Experimental results have been obtained using a fused quartz disc of diameter 1.5 cm. ground to form a reflective surface with an eight meter radius of curvature and a thickness of 0.121 inches. A mounting bracket 52 engages threads 53 on the structure 51. The mounting bracket supports the mirror 50 with O-ring 54, providing a vacuum-tight seal for the mirror structure. The structure 51 of the laser is ground to provide an optically flat surface 55 on which the mirror 50 is supported. The optically flat surface is required in order to ensure uniform deflection in the shape of the mirror as force is applied.

The mounting bracket 52 includes a plunger 56 that engages threads on the mounting bracket 52. The threads are preferably very fine in order to allow fine adjustment of the force supplied by the plunger 56. A small foot 57 formed of nylon or other suitable non-abrasive material, engages the center of the mirror 50. The nylon foot is mounted on a spring-loaded ball plunger 58 on the end of the threaded plunger 57. The spring-loaded plunger facilitates supporting the mirror 50 against the surface 55 as the plunger 56 is withdrawn.

Because the radius of curvature $R_M$ of the mirror 50 in an undeflected state is so great, it acts under force from plunger 57 as a flat, flexible plate. The amount of deflection of the plate formed by the mirror 50 can be predicted using standard formulas for load applied to flat plates, such as provided in Raymond J. Roark, *FORMULAS FOR STRESS AND STRAIN*, 4th Edition, McGraw-Hill Book Company, 1965, pp 216,217. For the embodiment illustrated in FIG. 5, the mirror 50 is expected to behave as a flat plate with edges supported and a generally uniform load applied by the plunger 56 over a circular area defined by the foot 57.

Experimental results on a fused quartz mirror formed with an eight meter radius of curvature and a diameter of 1.5 cm. reduced to a thickness of 0.121 inches, demonstrate the ability to deflect the eight meter radius to as large as thirteen meters. This range of deflection is suitable for the applications discussed above with respect to FIGS. 1–4. The beam size at the reflective surface is on the order of millimeters. Accordingly, the shape of the mirror at the location at which the beam impinges, behaves very much as predicted by the formulas set out in Roark. Much greater ranges of deflection can be obtained with thinner mirror discs, or other more flexible materials.

In conclusion, it has been demonstrated that varying the shape of a mirror in a laser cavity is useful for controlling the mode size of desired modes of laser oscillation. By controlling the mode size, the need for adjustable apertures for mode suppression is eliminated. Further, the mode size can be optimized to match the active region of the laser medium for any laser using a mirror having an adjustable shape.

The shape of the mirror in the embodiment described is spherical. Other shapes, such as parabolic, cylindrical or flat, could be used in more complex laser resonant cavities. Further, the embodiment described employs a plunger adapted to be manually adjusted for applying force to change the shape of the mirror. Equivalent systems could use stepper motors to drive the plunger with great precision. Further, other apparatus could be used to apply force, as is well known.

The foregoing description of the preferred embodiment of the present invention has been presented for purposes of illustration and description. It is not intended to be exhaustive or to limit the invention to the precise form disclosed. Obviously, many modifications and variations will be apparent to practitioners skilled in this art. The embodiment was chosen and described in order to best explain the principles of the invention and its practical application, thereby enabling others skilled in the art to understand the invention for various embodiments and with various modifications as are suited to the particular use contemplated. It is intended that the scope of the invention be defined by the following claims and their equivalents.

We claim:

1. A laser resonator having a gain medium, excitation means and resonant cavity which are capable of supporting at least one longitudinal mode and a plurality of transverse modes of oscillation, the resonant cavity including a first mirror with a reflective surface having a shape, and a second mirror, mounted with the first mirror to define an optical path for the transverse modes in the resonant cavity, wherein cross-sectional sizes of the transverse modes at a given location along the optical path within the resonant cavity are controlled by the shape of the reflective surface on the first mirror and including an aperture at the given location having a cross-sectional size; wherein an improvement comprises:

means, mounted with the first mirror, for adjusting the shape of the reflective surface on the first mirror so that the cross-sectional size of a desired transverse mode at the given location matches the cross-sectional size of the aperture.

2. The improvement of claim 1, wherein the shape of the reflective surface on the first mirror is essentially spherical.

3. The improvement of claim 1, wherein the first mirror comprises a flexible disc with a first side and a second side, the first side including the reflective surface and facing the laser cavity, and the second side opposite the first side facing away from the laser cavity, and wherein the means for adjusting comprises:

means, engaging the second side, for applying adjustable force to cause an adjustable amount of deflection of the reflective surface on the first side of the disc to change the shape of the reflective surface.

4. The improvement of claim 3, wherein the means for applying adjustable force comprises a manually adjustable plunger.

5. The improvement of claim 1, wherein the shape of the reflective surface on the first mirror is essentially spherical having a radius of curvature, and the means for adjusting the shape of the first mirror adjusts the radius of curvature.

6. The improvement of claim 1, wherein the aperture is defined by a laser bore.

7. A laser, comprising:

a first mirror having a spherical reflective surface with a radius of curvature;

a second mirror, mounted with the first mirror to define a resonant cavity;

a laser gain medium, mounted inside the resonant cavity, and means for exciting the laser gain medium, capable of supporting at least one longitudinal mode and a plurality of transverse modes within the resonant cavity, wherein cross-sectional sizes of transverse modes at a given location within the laser cavity are controlled by the radius of curvature of the reflective surface of the first mirror;

an aperture at the given location having a cross-sectional size; and means, mounted with the first mirror, for adjusting the radius of curvature of the spherical reflective surface on the first mirror so that the cross-sectional size of a selected transverse mode at the given location matches the cross-sectional size of the aperture.

8. The laser of claim 7, wherein the aperture is defined by a laser bore defining an effective aperture at the given location, the laser bore containing the laser gain medium.

9. The laser of claim 7, wherein the first mirror comprises a flexible disc with a first side and a second side, the first side including the reflective surface, and the second side opposite the first side, and wherein the means for adjusting comprises:
   means, engaging the second side, for applying adjustable force to cause an adjustable amount of deflection of the reflective surface on the first side of the disc to change the radius of curvature.

10. The laser of claim 9, wherein the means for applying adjustable force comprises a manually adjustable plunger.

11. A laser, comprising:
   a first mirror including a reflective surface having a shape;
   a second mirror, mounted with the first mirror to define a resonant cavity;
   a laser gain medium mounted inside the resonant cavity, and means for exciting the laser gain medium, capable of supporting a plurality of longitudinal modes, and for each longitudinal mode a plurality of transverse modes within the resonant cavity, wherein cross-sectional sizes of the transverse modes at a given location within the laser cavity are controlled by the shape of the first mirror;
   an aperture inside the resonant cavity at the given location having a cross-sectional size;
   means, mounted within the resonant cavity, for selecting a longitudinal mode for oscillation; and
   means, mounted with the first mirror, for adjusting the shape of the reflective surface on the first mirror so that the cross-sectional size at the given location of a selected transverse mode of the selected longitudinal mode matches the cross-sectional size of the aperture.

12. The laser of claim 11, wherein the shape of the reflective surface on the first mirror is essentially spherical.

13. The laser of claim 11, wherein the first mirror comprises a flexible disc with a first side and a second side, the first side including the reflective surface and facing the resonant cavity, and the second side opposite the first side facing away from the resonant cavity, and wherein the means for adjusting comprises:
   means, engaging the second side, for applying adjustable force to cause an adjustable amount of deflection of the reflective surface on the first side of the disc to change the shape of the reflective surface.

14. The laser of claim 13, wherein the means for applying adjustable force comprises a manually adjustable plunger.

15. The laser of claim 11, wherein the shape of the reflective surface on the first mirror is essentially spherical having a radius of curvature, and the means for adjusting the shape of the reflective surface on the first mirror adjusts the radius of curvature.

16. The laser of claim 11, wherein the aperture is defined by a laser bore defining an effective aperture at the given location, the laser bore containing the laser gain medium.

* * * * *